Patented Dec. 28, 1937

2,103,522

UNITED STATES PATENT OFFICE 2,103,522

THERAPEUTIC COMPOSITION

Joseph Ebert, Westmont, N. J., assignor to The Farastan Company, Philadelphia, Pa., a corporation of Pennsylvania No Drawing. Application December 3, 1936, Serial No. 113,985

6 Claims. (Cl. 260—104)

This invention relates to certain new derivatives of hydroxy amino benzoic acid which are of low toxicity and useful in the practice of medicine as analgesic and internal antiphlogistic agents. It includes these new products, and new processes for their preparation.

The new compounds which are included in the present invention are derivatives of 1-hydroxy 4-amino 2-benzoic acid in which the hydrogen of the hydroxy group is replaced with an acetyl group and one hydrogen of the amino group is replaced by a toluenesulfonyl group. These compounds may be represented generally by the graphic formula:

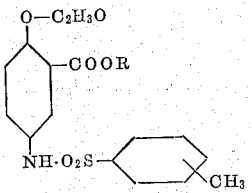

in which R may be hydrogen or methyl. The toluenesulfonyl group may have the methyl radical and the sulfonyl radical in either the ortho, the meta or the para positions, but inasmuch as the compounds in which these groups are present in the para position are much cheaper to produce, because of the availability of paratoluenesulfonyl chloride, and because the properties of these compounds are not materially different, whether the toluenesulfonyl group is ortho, meta or para, I prefer to use the para derivatives.

I have indicated that either the free carboxylic acids or their methyl esters may be used, and are included as new products in the invention. The higher esters, such as the ethyl ester and other higher esters, have been prepared, but these higher esters do not form well defined crystals, as do the acids and the methyl esters, and are extremely difficult to crystallize, being for the most part liquid.

In preparing these new compounds, an advantageous method is to use 1-hydroxy 4-amino 2-benzoic acid, or if the methyl ester is desired as the final product, the methyl ester of this compound, and introduce into it the toluenesulfonyl group and the acetyl group successively. The toluenesulfonyl group is introduced by reacting the 1-hydroxy 4-amino 2-benzoic acid with a toluenesulfonyl halide, advantageously the chloride, by heating these two compounds together in water in the presence of the required amount of an alkali. The resulting product may be precipitated from the alkaline solution by acidification and acetylated to introduce the acetyl group by heating it with acetic anhydride in an inert organic solvent, such as benzene. The 4-toluenesulfonylamino 1-acetylhydroxy 2-benzoic acid (or its methyl ester) so obtained may be purified by treating an alcoholic solution of the crude product so obtained with a decolorizing agent, such as activated carbon, alumina, fuller's earth, diatomaceous earth, or other suitable decolorizing agents. The final products are obtained in high yields and as well defined crystals. The acids are soluble in alkali to form salts, and both the acids and the methyl esters are soluble in alcohol and other organic solvents, but relatively insoluble in water.

The invention will be further illustrated by the following specific examples, although it is not limited thereto.

*Example 1.*—Preparation of 4-p-toluenesulfonylamino 1-acetylhydroxy 2-benzoic acid. To a solution of 166 parts by weight of anhydrous sodium carbonate in 1750 parts of water in a steam-jacketed iron vessel provided with a reflux condenser are added 153 parts by weight of 1-hydroxy 4-amino 2-benzoic acid. When this is completely dissolved, 210 parts of p-toluenesulfonyl chloride are added. The resulting mixture is heated with agitation at approximately 80° C. for about six hours and is then allowed to cool to room temperature, after which it is acidified with dilute hydrochloric acid until the reaction mixture is acid to Congo paper. The resulting precipitate is filtered off in a filter press or suction filter, and is washed with water until it is free from chlorine ions. The crude 4-toluenesulfonylamino 1-hydroxy 2-benzoic acid is obtained in yields of about 95 to 97% of theoretical. It is readily soluble in alcohol and other organic solvents, and may be purified by recrystallization from one of these solvents. The pure compound melts at 234–235° C. (uncorrected) with decomposition.

307 parts of this toluenesulfonyl compound so produced are heated with a mixture of 110 parts of 97% acetic anhydride and about 1200 parts of benzene at about 80° C. in an enameled vessel provided with a steam jacket and reflux condenser for about eight hours with agitation. At the end of this period, the solvent and the acetic acid and excess acetic anhydride are distilled off and the residue is dissolved in about 700 parts of methyl alcohol or ethyl alcohol and decolorized by agitating it with charcoal, activated carbon, activated alumina, fuller's earth, diatomaceous earth, or other suitable decolorizing agent. The yield of the pure 4-toluenesulfonylamino 1-acetylhydroxy 2-benzoic acid is from 85 to 90% of theoretical. The compound melts at 193–194° C. (uncorrected). It is soluble in alkali to form salts and in alcohol and other organic solvents. It is a white or pinkish-white powder with a bitter taste.

*Example 2.*—The methyl ester of 4-p-toluenesulfonylamino 1-acetylhydroxy 2-benzoic acid is prepared by a process almost the same as that of the preceding example, except that the methyl ester of the 1-hydroxy 4-amino 2-benzoic acid is used as the starting material. This is obtained in the usual manner by esterifying the free carboxylic acid with methyl alcohol in the presence of a suitable esterifying agent, such as strong sulfuric acid or gaseous hydrochloric acid. This methyl ester has a melting point of 96–97° C. (uncorrected).

The intermediate toluenesulfonyl compound, which is produced from the ester and para toluenesulfonyl chloride, by the process described in Example 1, melts at 120–122° C. (uncorrected). The pure methyl ester of 4-p-toluenesulfonyl-amino 1-acetylhydroxy 2-benzoic acid, which is produced from the intermediate toluenesulfonyl compound and acetic anhydride by heating the compounds together in an inert solvent, such as benzene, as in Example 1, with yields of 85 to 90% of theoretical, has a melting point of 116–118° C. (uncorrected) and when crystallized from alcohol forms fine, white needles with a slightly bitter taste. The ester is soluble in alcohol and other organic solvents, but is practically insoluble in water.

Instead of using para toluenesulfonyl chloride in the preparation of the above compounds, the corresponding ortho or meta toluenesulfonyl chloride may be used, with the production of the corresponding ortho or meta toluenesulfonyl derivative, which resemble the para derivative quite closely both in physical and chemical properties, as well as in therapeutic properties.

These new compounds are useful for the treatment of arthritic, rheumatoid and neuritic conditions, as they have a low toxicity and are analgesic and antiphlogistic in effect. For such use, they are advantageously admixed with one of the organic iodine derivatives containing loosely-bound or labile iodine, which are recognized to be valuable for the treatment of arthritis, rheumatism and neuritis and the like. Organic iodine derivatives, which have loosely-bound or labile iodine, and which may be advantageously used in admixture with the new products of the present invention, are protein iodine compounds, such as casein iodide, peptone iodide, the iodide of egg albumen and iodides of other similar proteins. The use of casein iodide containing from about 14 to about 16% of active iodine is particularly advantageous, and may be used in the proportions of about 1 part of the casein iodide to about 4 parts of the 4-toluenesulfonylamino 1-acetyl-hydroxy 2-benzoic acid or its methyl ester.

I claim:

1. Compounds of the formula

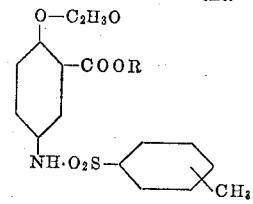

in which the relative position of the SO$_2$ group and the CH$_3$ group is one of the three positions, namely, ortho, meta and para positions, and in which R is a member of the group consisting of hydrogen and methyl.

2. 4-toluenesulfonylamino 1-acetylhydroxy 2-benzoic acids.

3. The methyl esters of 4-toluenesulfonylamino 1-acetylhydroxy 2-benzoic acids.

4. 4-p-toluenesulfonylamino 1-acetylhydroxy 2-benzoic acid.

5. The methyl ester of 4-p-toluenesulfonyl-amino 1-acetylhydroxy 2-benzoic acid.

6. The process of preparing 4-toluenesulfonyl-amino 1-acetylhydroxy 2-benzoic acids and their methyl esters, which comprises reacting a compound of the class consisting of 1-hydroxy 4-amino 2-benzoic acid and its methyl ester with a toluenesulfonyl halide, in the presence of an alkali, and reacting the resulting compound with acetic anhydride in an inert organic solvent.

JOSEPH EBERT.